(12) United States Patent
Liu et al.

(10) Patent No.: US 11,942,638 B2
(45) Date of Patent: Mar. 26, 2024

(54) NICKEL-RICH LAYERED OXIDE CATHODE MATERIALS FOR Li ION BATTERIES

(71) Applicant: City University of Hong Kong, Hong Kong (HK)

(72) Inventors: Qi Liu, Hong Kong (HK); He Zhu, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 305 days.

(21) Appl. No.: 17/498,751

(22) Filed: Oct. 12, 2021

(65) Prior Publication Data
US 2022/0115659 A1    Apr. 14, 2022

Related U.S. Application Data

(60) Provisional application No. 63/090,318, filed on Oct. 12, 2020.

(51) Int. Cl.
| | |
|---|---|
| *H01M 4/525* | (2010.01) |
| *C01G 53/00* | (2006.01) |
| *H01M 4/04* | (2006.01) |
| *H01M 4/505* | (2010.01) |
| *H01M 4/02* | (2006.01) |

(52) U.S. Cl.
CPC ........... *H01M 4/525* (2013.01); *C01G 53/50* (2013.01); *H01M 4/0471* (2013.01); *H01M 4/505* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 6,623,886 B2 | 9/2003 | Yang et al. | |
| 10,581,070 B2 | 3/2020 | Wu et al. | |
| 2012/0119167 A1* | 5/2012 | Matsumoto | C01G 53/42 |
| | | | 252/519.15 |
| 2019/0190019 A1 | 6/2019 | Lee et al. | |

* cited by examiner

*Primary Examiner* — Lucas J. O'Donnell
(74) *Attorney, Agent, or Firm* — Idea Intellectual Limited; Margaret A. Burke; Sam T. Yip

(57) ABSTRACT

A controlled oxidizing method is provided for preparing a high-performance nickel-rich lithium ion battery cathode material having a composition of $LiNi_xM_{1-x}O_2$, where $0.6<x<0.9$, and M is one or more metals selected from the group consisting of Co, Mn, Fe, Ti, Zr, V, and Cr. The method comprises combining a water-soluble salt precursor of nickel and a water-soluble salt precursor of the one or more M metals with one or more oxidizing agents to form an aqueous solution. The aqueous solution is alkalized to a selected pH value to produce precipitated precursors. The precipitated precursors are mixed with a lithium precursor to form a lithiated precursor. The lithiated precursor is calcined to form the nickel-rich lithium ion battery cathode material.

12 Claims, 23 Drawing Sheets

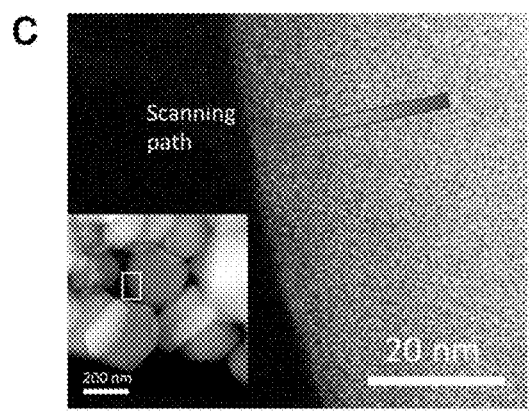
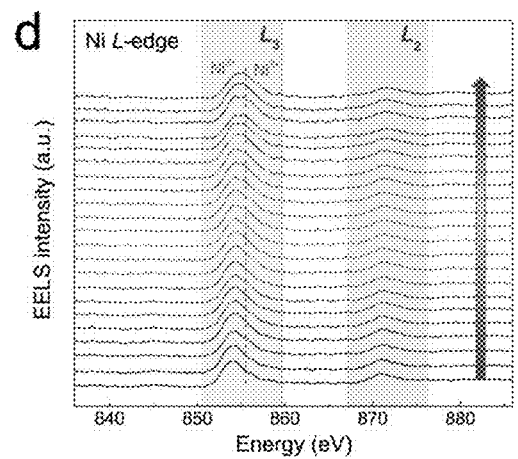
FIG. 4c        FIG. 4d
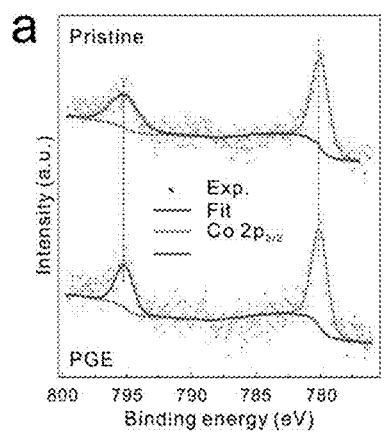
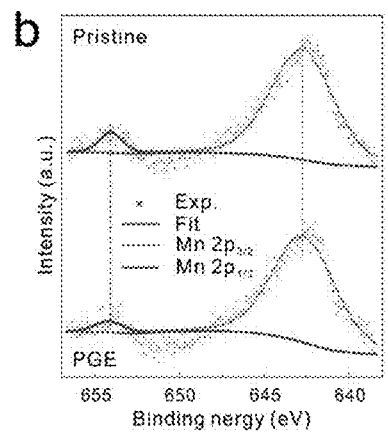
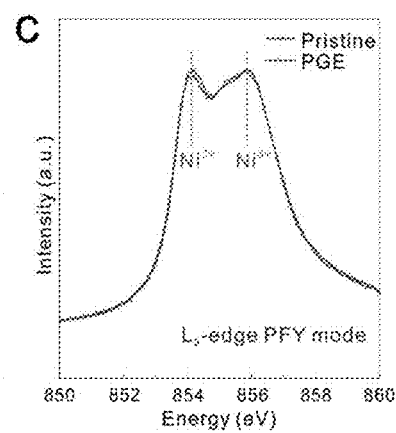
FIG. 5a        FIG. 5b        FIG. 5c

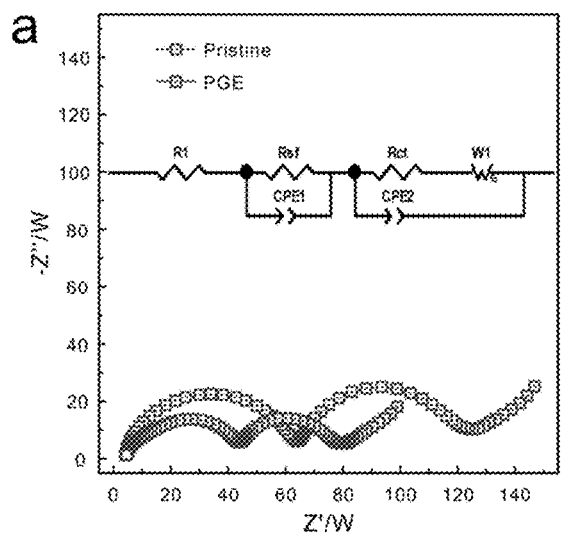
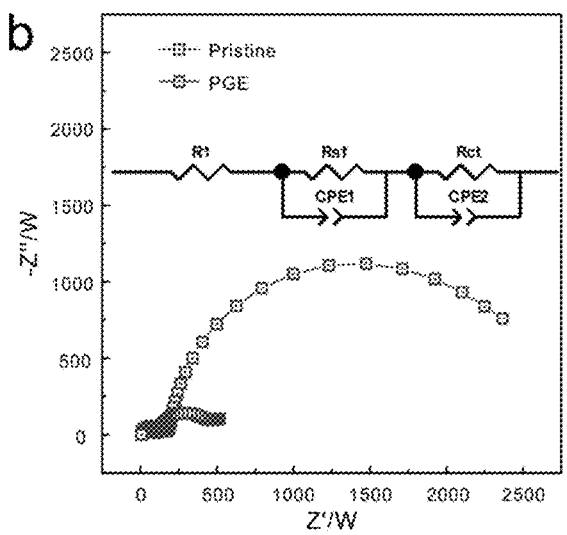
FIG. 9a
FIG. 9b

NICKEL-RICH LAYERED OXIDE CATHODE MATERIALS FOR Li ION BATTERIES

FIELD OF THE INVENTION

The present invention relates to fabrication and structures of cathode materials for lithium ion batteries and, more particularly, to nickel-rich layered oxide cathodes for lithium ion batteries.

BACKGROUND

The increasing concerns of global warming and fossil-fuel depletion have triggered worldwide promotion of electric vehicles (EVs) in the last decade. The success of this effort depends largely on the development of high-energy-density lithium-ion batteries (LIBs), which hold the prospect of replacement of internal combustion engines with rechargeable batteries. At present, layered Ni-rich transition-metal (TM) oxides, $LiNi_xCo_yMn_{1-x-y}O_2$ (x>0.6, referred as Ni-rich NCM), are widely recognized as the leading candidates for cathode materials for the next-generation EV-LIBs. The high capacity of Ni-rich NCM is provided by a two-electron $Ni^{2+/4+}$ redox couple, so approaching the maximum content of Ni increases capacity from 160 $mAhg^{-1}$ for $LiNi_{1/3}Co_{1/3}Mn_{1/3}O_2$ (NCM111) to more than 200 $mAhg^{-1}$ for NCM811. Also, since Ni is much less expensive than Co, maximizing the Ni content will greatly reduce the battery cost and thereby reduce the EV cost-to-mileage ratio.

Despite these excellent prospects, the structural instability of Ni-rich NCM materials induces rapid performance degradation over the course of cycling. The underlying mechanism is that the layered framework undergoes a series of structural transitions among H1, H2 and H3 (space group, R-3m) during the charge-discharge process. The above structural transitions are theoretically inevitable in the NCM materials, leading to repetitive strains that become even more profound as the Ni content increases (~5% of high-voltage c-contraction in NCM811). In the most extreme case, high-density intergranular cracks are induced inside the secondary particles (especially along the primary grain boundaries), which eventually brings about pulverization of the particles, poor cycling stability and fast battery failure. Meanwhile, the intrinsic electron and $Li^+$ transportation kinetics in Ni-rich NCM materials is greatly inferior, especially at the primary grain boundaries. This substantially limits their rate capability, another major challenge for the Ni-rich cathodes, to satisfy the high power or quick charge applications.

To tackle these challenges, substantial efforts towards optimizing Ni-rich NCM materials have been made. In one approach, foreign protective layers (e.g., carbon, polymer, inorganic oxides and so on) are used as coatings. These coating layers require an additional coating process, and their homogeneity and completeness remain a challenge. More importantly, the diverging dynamic behaviors of host lattice and coating layer also leads to cracks and even separation upon long-term cycling, which fails to protect the bulk materials. Further, coatings cannot efficiently mitigate the underlying structural transitions and thus the internal stress in the primary grains, especially in view of the fact that they are generally accomplished at a secondary-particle scale. Thus, there is a need in the art for improved Ni-rich NCM material design down to the primary-grain level to overcome the above deficiencies.

SUMMARY OF THE INVENTION

The present invention provides a facile PGE approach to engineer a Ni-rich NCM cathode material down to primary-grain level. By fine tuning the local electronic structure to induce the Jahn-Teller octahedral distortion, monoclinic grain boundaries are built within the hexagonal primary grains, which significantly improved the cycling stability and rate capability of the cathode material. Advantageous over other methods, the cathode material involves minimum alterations of structure, constituents, and morphology, which ensures industrial applicability without tradeoffs regarding to energy density and battery safety.

In one aspect, the present invention provides a controlled oxidizing method for preparing a high-performance nickel-rich lithium ion battery cathode material having a composition of $LiNi_xM_{1-x}O_2$, where 0.6<x<0.9, and M is one or more metals selected from the group consisting of Co, Mn, Fe, Ti, Zr, V, and Cr. The method comprises combining a water-soluble salt precursor of nickel and a water-soluble salt precursor of the one or more M metals with one or more oxidizing agents to form an aqueous solution. The aqueous solution is alkalized to a selected pH value to produce precipitated precursors. The precipitated precursors are mixed with a lithium precursor to form a lithiated precursor. The lithiated precursor is calcined to form the nickel-rich lithium ion battery cathode material having a composition of $LiNi_xM_{1-x}O_2$, where 0.6<x<0.9, and M is one or more metals selected from the group consisting of Co, Mn, Fe, Ti, Zr, V, and Cr.

In another aspect, the invention provides a nickel-rich lithium ion battery cathode material having a composition of $LiNi_xM_{1-x}O_2$, where 0.6<x<0.9, and where M is one or more metals selected from the group consisting of Co, Mn, Fe, Ti, Zr, V, and Cr. The cathode material has a microstructure comprising primary particles with secondary particles formed on the surfaces of the primary particles, the primary particles having manipulated primary grain interfaces with nickel ions on surfaces of the primary particles being oxidized from a 2+ to a 3+ state. The secondary particles are formed on the surfaces of the primary particles with a diameter of approximately 5-20 nm. The secondary particles are agglomerated with primary grains with monoclinic grain boundaries, so there is a three-dimensional monoclinic grain boundary network spreading over each entire secondary particle.

BRIEF DESCRIPTION OF THE DRAWINGS

FIGS. 4a-4d are the characterization of electronic states in multiple detective depths. FIG. 4a shows Gaussian-Lorentzian fitting profiles of the XPS spectra for the pristine and PGE-NCM811 materials. The inset depicts the penetration depth of 5 nm for the XPS method. FIG. 4b is a comparison of the Ni $L_3$-edge soft XAS spectra and Ni K-edge hard XAS spectra for both pristine and PGE-NCM811. The dashed lines direct the oxidizing states of the Ni ions in soft XAS. The arrow shows the increasing trend of the $Ni^{3+}$ state in the PGE-NCM811 surface. The insets depict the penetration depth of about 20 nm for the soft XAS and sub-micron level for hard XAS. FIG. 4c are HAADF images of the PGE-NCM811 material. The arrow indicates the pathway and direction of the EELS scan. The inset is the corresponding low-magnification HAADF image and the square emphasizes the amplifying area for the EELS measurement. FIG. 4d shows EELS spectra of Ni L-edge scanning along the pathway in FIG. 4c. The squares depict the $L_3$ and $L_2$ peaks, respectively. The dashed line shows the EELS character of $Ni^{3+}$. The arrow directs the scanning pathway in FIG. 4c.

FIGS. 5a-c are characterizations of electronic structures for pristine and PGE-NCM811 materials. XPS spectra regarding to FIG. 5a Co-2p and FIG. 5b Mn-2p holes for the pristine and PGE-NCM811 materials. FIG. 5c shows a comparison of the Ni $L_3$-edge XAS PFY spectra for the pristine and PGE-NCM811 materials.

FIG. 6a show the initial charge and discharge curves for the pristine and PGE-NCM811 materials at 1/10 C. The circle on the charging curve shows the H1-H2 phase transition peak in the pristine NCM811. The circles on the discharging curve direct the H2-H3 phase transition in the pristine NCM811. The differential capacity curves in this range are presented in the inset. FIG. 6b shows the capacity retentions for the pristine and PGE-NCM811 materials at 1/10 C. FIGS. 6c-6d show charge-discharge curves at different cycles for FIG. 6c the pristine and FIG. 6d PGE-NCM811 materials. The arrows show the trends of capacity and voltage fade during cycling.

FIG. 9a-9b show the AC impedance spectra of the pristine and PGE-NCM811 before (FIG. 9a) and after (FIG. 9b cycles at charged state (4.3 V).

FIG. 11a shows contour plots of the pristine NCM811 along with the corresponding voltage profile. FIGS. 11b-11c show the (003) and (101) peak profiles of the in situ XRD patterns for the pristine (FIG. 11b) and PGE-NCM811 (FIG. 11c) materials upon initial charging. The arrows depict the peak evolutions of H1 phase, and the green arrows show the peak evolutions of the H2 phase. FIGS. 11d-11e show the lattice evolutions of a-axis (FIG. 11d) and c-axis (FIG. 11e) extracted from Rietveld refinements of the in situ XRD patterns. The shaded area emphasizes the H1-H2 coexisting region. The dashed line separates the voltage range of the H2 and H3 phase.

FIG. 15a shows typical low-r PDF patterns of the pristine and PGE-NCM811 materials. The arrows direct the peak splitting related to the octahedron distortion. The inset shows the elongated octahedra after engineering. FIG. 15b shows the PDF refinement patterns for pristine (upper) and PGE (middle and bottom) materials with different structural models. FIG. 15c is a schematic diagram of the secondary particles consisting of R-3m grains and C/2m grain boundaries.

DETAILED DESCRIPTION

Figure 1:
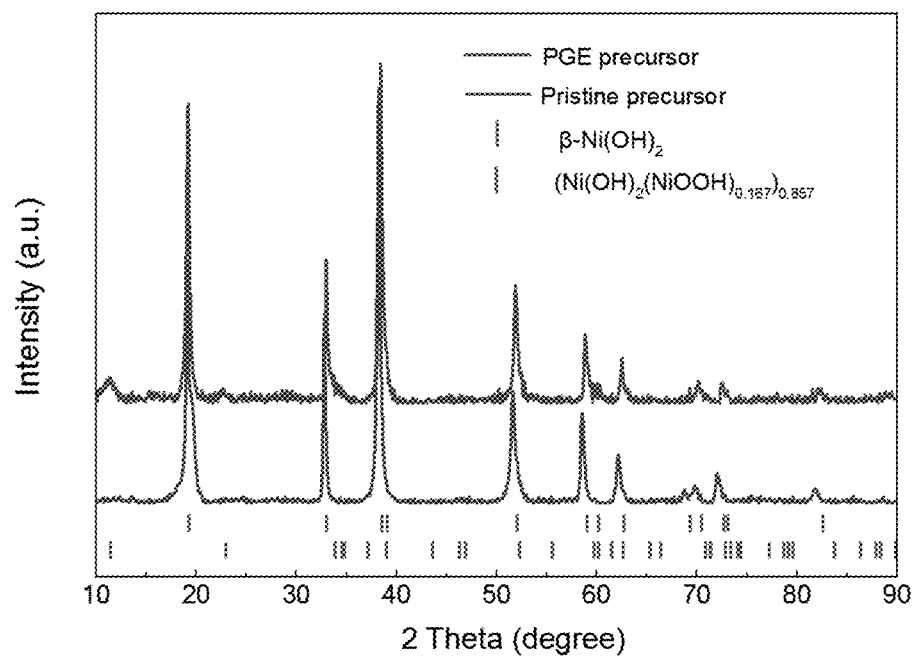
FIG. 1 shows XRD patterns for precursors of pristine and oxidized Ni-rich materials.
Figures 2A, 2B:
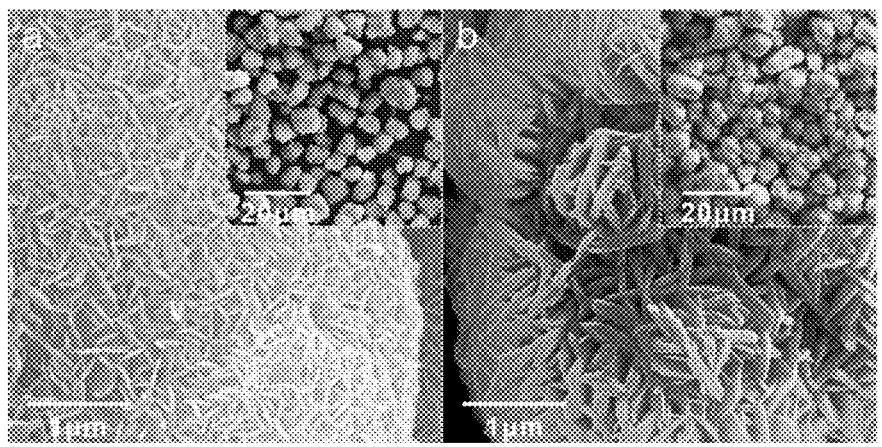
FIGS. 2a-2e are morphologies of the prepared materials characterized by SEM. 2a-2b are SEM images of the precursors for 2a PGE-NCM811 and 2b pristine NCM811. 2c-2d are SEM images of as-prepared materials of 2c PGE-NCM811 and 2d pristine NCM811. All the insets in 2a-2d are the corresponding low-magnification images. 2e shows mapping of energy dispersive spectroscopy (EDS) for Ni, Co and Mn in PGE-NCM811.
Figures 2C, 2D:
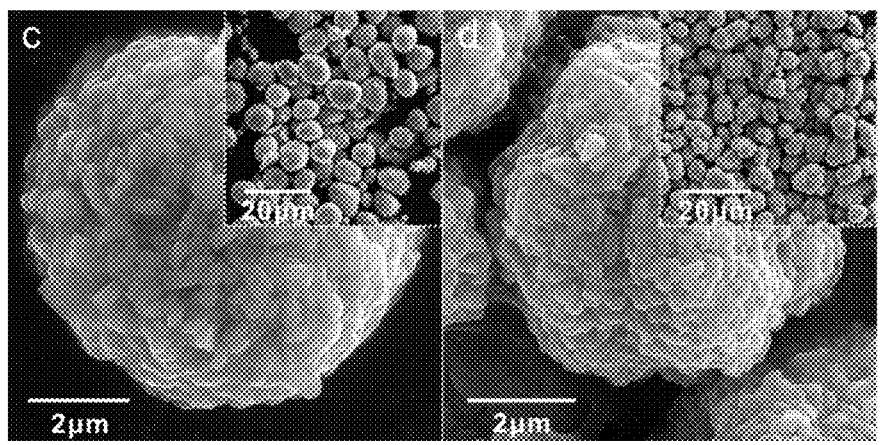
Figure 2E:
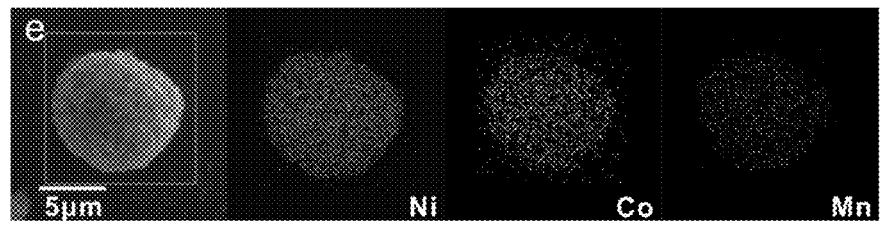

The hexagonal structure of Ni-rich NCM materials possesses edge-sharing octahedral slabs separated alternatively by Li-ion layers. The R-3m symmetry is strictly characterized by the equal TM-O bond lengths in octahedra, where the ligand field is strongly coupled with the local electronic structure. Theoretically, the $d^7$ configuration of $Ni^{3+}$ in the octahedral crystal field could split into a low-spin $t_{2g}^6 e_g^1$ state. This effect will induce local distortion of octahedra, which lowers the average symmetry from hexagonal R-3m to monoclinic C2/m. Nevertheless, the presence of $Ni^{2+}$, derived from the substitution of Co and Mn, triggers the hopping between $Ni^{3+}$ and $Ni^{2+}$ states, which inhibits the Jahn-Teller octahedral distortion and gives rise to the hexagonal R-3m symmetry. In fact, the locally distorted monoclinic structure has been previously proposed as a potential structure-stabilizer for R-3m lattice by preventing the interlayer collapse. Furthermore, this monoclinic phase has been demonstrated to exhibit a higher mixed conductivity. Although moderately distorted, the C2/m lattice matches well with the R-3m structure, and their transform could be possibly manipulated by tuning the electronic configurations. The present invention relates to a novel architecture that integrates the monoclinic and hexagonal structures through tuning the electronic states to optimize the performance of the Ni-rich NCM materials.

The inventive approach to improve the performance of Ni-rich layered cathode materials, through building monoclinic surfaces onto hexagonal primary grains, is accomplished by engineering the octahedral ligand field to induce Jahn-Teller distortion of the low-spin $Ni^{3+}$ state. In this way, an elaborate architecture of a three-dimensional monoclinic functional network has been designed to spread over a secondary particle, which stabilizes the hexagonal structure of primary grains from phase transitions, and also offers an interconnected highway for both ionic and electronic transportations. Accordingly, a high performance of enhanced cycling stability and outstanding rate capability has been achieved in the inventive cathode material.

In one aspect, the present invention provides a method for fabricating a cathode material for use in an energy storage device that involves modifying the morphology of a precursor by manipulating primary-grain interfaces of the precursor followed by synthesizing the cathode material using the precursor in a calcining process. The cathode material may have a formula of $LiNi_xM_{1-x}O2$, wherein 0.6<x<0.9, and M represents one or more transition metal selected from cobalt, manganese, iron, titanium, zirconium, vanadium and chromium. In one embodiment, M is primarily cobalt and manganese with optional small amounts of other transition metal dopants. A minimum alteration of structure, constituents, and morphology are involved the method of the present invention, which ensures industrial applicability without tradeoffs regarding energy density and safety. This method is also non-toxic, low cost, and easy to control, making it applicable to large-scale industrial production.

In particular, modifying the morphology of the precursor includes enriching primary-grain interfaces of the precursor such as by constructing monoclinic grain boundaries within primary grains at the interfaces of the precursor. Modifying the morphology of the precursor may include oxidizing a plurality of interfacial atoms of the precursor so as to enrich the primary-grain interfaces, such that the nickel ions on the surface of primary precursors are oxidized from 2+ to 3+ state.

Oxidizing the interfacial atoms of the precursor includes mixing an aqueous solution containing a salt of the precursor with an oxidizing agent and extracting the precursor from the aqueous solution after oxidation. In particular, the precursor may be extracted using a precipitation and filtration method. The precursors may include nickel and additional transition metal salts such as sulfates, chlorides, or nitrates or other soluble salts.

The oxidizing agent may be selected from known oxidizing agents such as potassium permanganate, potassium dichromate, hydrogen peroxide, perchloric acid and ferric chloride. The amount of the oxidizing agent may be in the range of approximately 1 to approximately 20 mol %.

The precursor solution with the oxidizing agent is brought to a pH value sufficient to induce precipitation of the precursors. In general, a pH in a range of 9.5 to 11.5 may be used. For example, a pH of greater than 11 for sulfate precursors, more particularly, a pH of 11.2 may be used to precipitate the precursors. The precipitated precursors and washed and dried to create a precursor power. The composition of the precipitate is $TM(OH)_x$, where TM=cobalt, manganese, iron, titanium, zirconium, vanadium or chromium.

The precursor powders of the transition metals are mixed with a stoichiometric amount of any suitable lithium precursor such as lithium hydroxide monohydrate, or a lithium salt such as lithium oxalate or lithium carbonate. Secondary particles are agglomerated with primary grains formed by a calcining process. The size of the primary grains is around 5-20 nm. The boundary of the primary grains is monoclinic phase, so each of the secondary particles includes a three-dimensional monoclinic grain boundary network that spreads over the secondary particles. In general, a mixing ratio range is 1.03 to 1.06:1 for the lithium precursor to the transition metal precursor. In one embodiment, the mixing ratio of the lithium precursor and the transition metal precursor is 1.06:1. Optionally, the calcining process includes a two-step calcining process, and includes (a) annealing the transition metal precursor and lithium precursor to form an intermediate product; and (b) further annealing the intermediate product to form the final product of the cathode material. The first anneal may be a lower-temperature anneal in the range of 400-600° C. for a period of 4-6 hours; the second anneal may be higher-temperature anneal in the range of approximately 600-1000° C. for a period of 10-20 hours in an oxygen-containing environment.

Examples

Synthesis of Pristine NCM811 and PGE-NCM811 Materials

The below example relates to the formation of a primary grain engineered (PGE) $LiNi_{0.8}Co_{0.1}Mn_{0.1}O_2$ (NCM811), a typical Ni-rich layered cathode material. Note that the other compositions of the present invention may also be formed using these techniques. The precursors of the pristine NCM811 and PGE-NCM811 were prepared according to the co-precipitation method described above. An aqueous solution of $NiSO_4 \cdot 6H_2O$, $CoSO_4 \cdot 7H_2O$ and $MnSO_4 \cdot 5H_2O$ (cationic ratio of Ni:Co:Mn=8:1:1) was pumped into a continuously stirred tank reactor (2 L, 600 rpm) under $N_2$ atmosphere. Simultaneously, an amount of NaOH and $NH_3 \cdot H_2O$ solutions selected to maintain the constant pH of 11.2 and ensure homogeneous deposition of transition metals was employed. For the preparation of the PGE-NCM811 material, in particular, an optimized amount of $KMnO_4$ was added into the solution as oxidant.

The precipitated precursor powders were obtained through washing, filtering and drying in a vacuum oven for 6 hours. Finally, the NCM811 materials were prepared by thoroughly mixing the precipitated precursor with $LiOH \cdot H_2O$ (Li/M ratio=1.06:1) followed by annealing at 500° C. for 5 h preliminarily (first anneal), and then annealed at 800° C. for 16 h in oxygen second anneal).

Electrochemical Measurements

Electrochemical tests were carried out using the standard CR2025 coin-type cells assembled in an Ar-filled glove box with the NCM cathode materials, Li metal anode, 1.0 M $LiPF_6$ in ethylene carbonate (EC)/dimethyl carbonate (DMC) (1:1 in volume) electrolyte and polypropylene separators. To fabricate the positive electrodes, the pristine NCM811 and PGE-NCM811 were each thoroughly mixed with super-P carbon and polyvinylidene fluoride (8:1:1 in weight) in N-methyl-pyrrolidone. Each obtained slurry was spread onto an Al foil and dried in a vacuum oven at 120° C. for 10 hours, then punched and weighed. The mass loading of active materials was about 2 mg·cm$^{-2}$. Galvanostatic charge-discharge cycling of the cells was performed under the cut-off voltages of 3.0 V to 4.3 V (vs. Li$^+$/Li). Electrochemical impedance spectroscopy (EIS) was measured by an electrochemical workstation (PARSTAT 2273) with an amplitude of 5 mV and a frequency range from 10 mHz to 100 kHz. Potentiostatic intermittent titration technique (PITT) measurement was conducted by applying a series of potentials from 3.7 V to 4.3 V with a step of 25 mV and then recording the current after the current was less than 0.01 C in each step. The Li$^+$ diffusion coefficient, D$^\sim$ (cm$^2 \cdot$s$^{-1}$), was calculated from the slope of lnI(t) vs. t plot by using the equation:

$$\tilde{D} = -\frac{d\ln(I)}{dt} \frac{4L^2}{\pi^2}$$

Here I(t) stands for the transient current (mA), t is the time (s) and L stands for thickness of the electrodes (cm).

Sample Characterizations

The ICP-MS measurement was conducted with PE Optima8000. The ex-situ XRD patterns were collected from the 11-ID-C beamline at Advanced Photon Source (APS) of Argonne National Laboratory (ANL), with the X-ray wavelength of 0.1173 Å. The Rietveld refinements of the XRD patterns were performed using Fullprof software. The morphology and elemental distribution of the samples were characterized by Helios Nanolab 600i high-resolution field emission scanning electron microscope (FESEM) equipped with an energy-dispersive X-ray spectroscopy (EDS) analyzer operating at an acceleration voltage of 20 kV. The XPS measurements were conducted using an ESCA System PHI 5400 instrument. The electronic conductivity of the samples was measured by a four-point probe volt-ampere method (SANFENG SB 118).

Collection and Analysis of In Situ Synchrotron XRD

The in situ XRD measurements were performed using 11-ID-C beamline at APS of ANL, with the X-ray wavelength of 0.1173 Å. Si (113) single crystal was used as monochromator for an X-ray beam at 105.7 keV. In a typical in situ collection, the coin cells (NCM811 cathode with Al current collector) were operated with a constant current of 1/10 C. A single XRD pattern was obtained during a time period of 300 s. The two-dimensional (2D) diffraction patterns were collected in the transmission geometry with a Perkin-Elmer detector. The sample-to detector distance, detector tilt angles and the instrumental resolution function were calibrated with a standard sample of $CeO_2$. The integration and calibration of the 2D patterns were performed with the Fit2D software, and the lattice parameters were extracted from the integrated XRD patterns using Fullprof software. For the Rietveld refinements, the backgrounds were subtracted by linear interpolation and the peak shapes were described using a pseudo-Voigt profile function.

Collection and Analysis of Soft and Hard XAS

The soft XAS spectra of Ni $L_3$-edge were collected in both TEY and PFY modes with the high-resolution spherical-grating monochromator (SGM) beamline at the Canadian Light Source (Saskatoon, Saskatchewan). The TEY signal was recorded as the specimen current, while PFY signal was measured by detecting the X-ray fluorescence photons emitted from the element of interest using Si drift detectors. Each powder sample (ca. 0.2 mg) was spread in a thin layer on a 3 mm×3 mm carbon conductive adhesive tape (Agar Scientific) and then pressed into the substrate. The carbon tape was attached to the sample holder at a 45° angle facing toward the photon beam. The hard XAS spectra of Ni K-edge (8333 eV) were collected on 20-BM-B beamline at APS of ANL by transmission mode. The powder sample was spread in a thin and uniform layer between Kapton tapes (McMaster-Carr), which needs to be homogeneous and free from pinholes. All the soft and hard XAS data was processed using IFEFFIT program.

STEM-EELS Characterization

The STEM-HAADF images and STEM-EELS spectra were performed on an aberration-corrected microscope (JEM-ARM 200F, JEOL) operating at 200 kV. Samples were prepared by dropping ethanol dispersion of particles onto a carbon-coated copper grid. The STEM imaging conditions were optimized for EELS with a probe size of 0.8 Å, a convergence semi-angle of 28.5 mrad, and the collection semi-angle of 88 mrad. The EELS spectra were collected with energy dispersion of 0.25 eV per channel and an energy resolution about 1 eV.

Collection and Analysis of X-Ray PDF

The PDF was extracted from high energy synchrotron X-ray total scattering by direct Fourier transform of reduced structure function (F(Q), up to Q≈24.7 Å) using 11-ID-C beamline at APS of ANL (X-ray wavelength 0.1173 Å). The NCM811 powders were loaded into a 2 mm capillary with data acquisition time of 15 minutes for each sample. The background scattering from the empty capillary was extracted. G(r) functions, $G(r)=4\pi r[\rho(r)-\rho_o]$, where $\rho(r)$ and $\rho_o$ are the local and average atomic number densities, were computed with PDFgetX3 software. The PDF refinements were carried out using PDFgui software package. The structural models were defined in hexagonal (R-3m) unit cell for the pristine NCM811, and monoclinic (C2/m) unit cell for the PGE-NCM811 sample. The parameters, including lattice constants, atomic positions and anisotropic thermal ellipsoids, are allowed to vary using a least squares approach until a best-fit of the PDF was obtained.

Computational Methods

The calculations of the electronic structure in this study were performed using the plane wave pseudo-potential implementation of density functional theory as written into Vienna ab initio simulation package (VASP) code. The spin-polarized generalized gradient approximation (GGA) calculations were carried out based on the Perdew-Burke-Ernzerhof (PBE) exchange-correlation functional and the projector augmented wave (PAW) potential. An energy cut-off of 520 eV was used for expanding the Kohn-Sham wave functions, and a gamma-centered 8×8×8 k-point grid was implied for the Brillouin zoon integration. All the lattice parameters were employed from the experimental PDF refinements. To correct the self-interaction error (SIE), the U-value of Ni-3d electrons was set to 6.0 eV indicated from the reference.

As seen in the XRD results of FIG. 1, the pristine NCM811 precursor is mostly identified as β-$Ni(OH)_2$ (JCPDS, No. 14-0117). However, after the addition of $KMnO_4$, a distinct phase was revealed in the PGE-NCM811 XRD patterns, which accorded with a composite hydroxide $(Ni(OH)_2(NiOOH)_{0.167})_{0.857}$ with a small amount of $Ni^{3+}$ (JCPDS, No. 89-7111). As the morphology of the primary precursors presented nanosheet morphology with large interfaces, as seen in FIG. 2a-2e, such oxidation effect acts on the interfacial atoms of the precursors, and then enrich in the primary-grain interfaces after oriented attachments of the interfaces during calcining. Furthermore, as the $NiO_2$ layers in NiOOH, compared to those in $Ni(OH)_2$, are arranged randomly, some degree of local distortions may be introduced into the PGE-NCM811 structure.

Figure 3A:
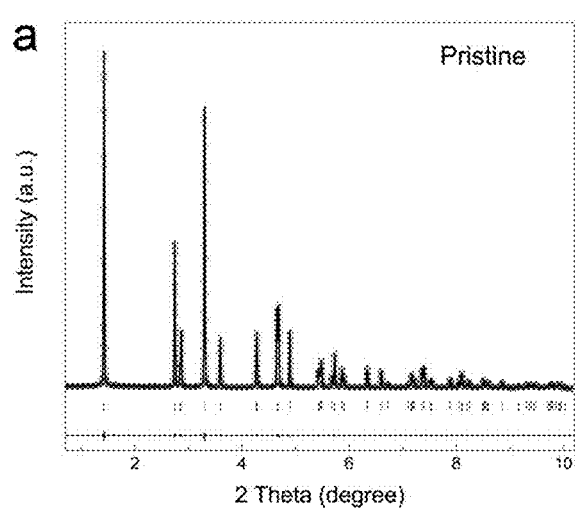
FIG. 3a-b are Rietveld refinements of the XRD patterns for 3a pristine and 3b PGE-NCM811 materials. The raw experimental data is shown with hollow circles. The calculated patterns are shown in lines. The vertical lines show the Bragg positions of the R-3m space group. The horizontal lines depict the difference of the raw data and the calculated patterns.
Figure 3B:
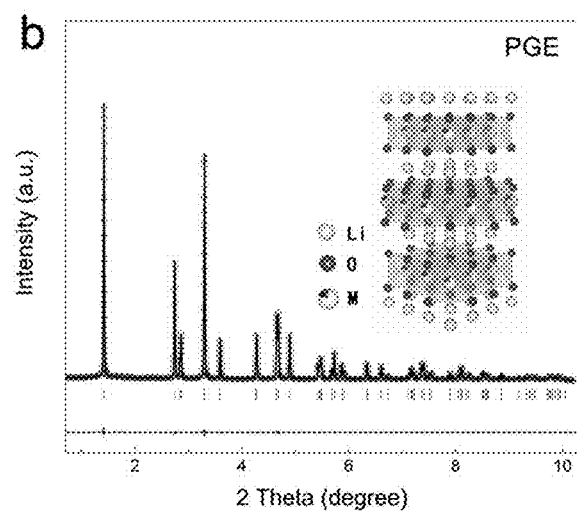

The ex situ XRD of FIGS. 3a-3b and inductively coupled plasma mass spectrometry (ICP-MS) measurements reveal that the average structures of both pristine NCM811 and PGE-NCM811 materials satisfy the typical R-3m symmetry with the compositions very close to the target. Accordingly, the primary grain engineering of the present invention does not change the layered framework and stoichiometric chemistry from the view of long-range coherence. Notably, the lattice parameters of PGE-NCM811, extracted from Rietveld refinements of the XRD pattern, are smaller than those of the pristine sample (Table 1). This further proves the higher valence of nickel ions (with a smaller ion-radius) derived from their oxidation, which will enable the Jahn-Teller monoclinic distortion in the PGE-NCM811.

TABLE 1

| Target materials | a-axis (Å) | c-axis (Å) | V (Å$^3$) |
|---|---|---|---|
| Pristine-NCM811 | 2.87145 (1) | 14.19623 (4) | 101.369 (1) |
| PGE-NCM811 | 2.86961 (1) | 14.18983 (6) | 101.194 (1) |

Gradient Electronic States in Grain Boundaries of PGE-NCM811

Figure 4A:
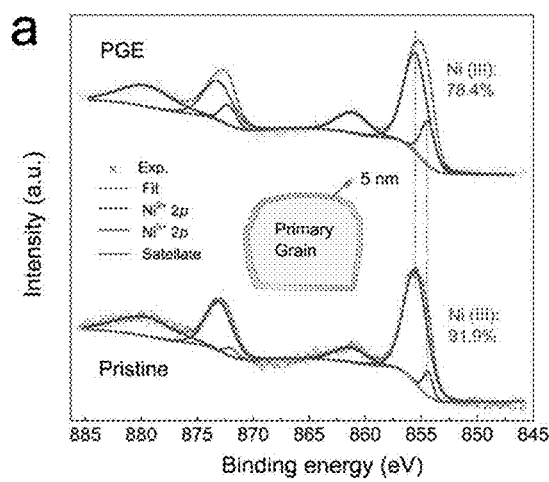

The effects of synthetic oxidation on the electronic states of PGE-NCM811 were followed by various valance analyses. X-ray photoelectron spectroscopy (XPS), which has a superficial penetration of 1-5 nm, was initially carried out to determine the surface chemistry (FIG. 4a). In the typical core-level spectra of Ni 2p, the spin-orbit doublets at 854.4 eV ($2p_{3/2}$) and 872.3 eV ($2p_{1/2}$) are assigned to the $Ni^{2+}$ state, while $Ni^{3+}$ can be distinguished by the splitting holes of $2p_{3/2}$ and $2p_{1/2}$ at 855.5 eV and 873.3 eV, respectively. For the PGE-NCM811, the binding energies of the Ni-2p spin-orbit doublets rigidly shifted to a higher value, accompanied with slight broadening of the Co-2p and Mn-2p XPS peaks (FIGS. 5a-b). Consequently, the $KMnO_4$ oxidizing dominantly ascends the average valance of Ni in the surface $NiO_6$-octahedral layers. The relative content of $Ni^{3+}$ and $Ni^{2+}$ could be provided by a semi-quantitative analysis of the integrated peak area, where the $Ni^{3+}$ content is estimated to be about 13.5% higher in the PGE-NCM811 outer layers.

Figure 4B:
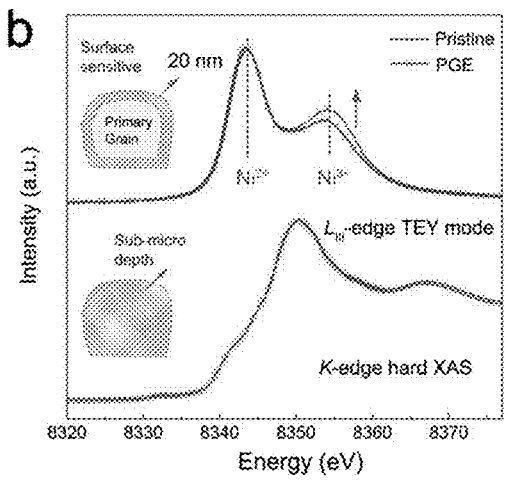

The Ni $L_3$-edge soft XAS signals (FIG. 4b), which correspond to the unoccupied Ni-3d states through 2p-3d excitations, were collected in the total electron yield (TEY) mode to further probe the chemical environment within a sensitive depth of about 20 nm. The intensity ratio of the double-peak characters fingerprints the oxidation states of $Ni^{2+}$ at 854.1 eV and $Ni^{3+}$ at 855.9 eV. We find that the $Ni^{3+}$ intensity of PGE-NCM811 material is stronger than that of pristine one in the soft XAS spectra, indicating a larger content of $Ni^{3+}$ existing in the grain surface area compared to the pristine alternative. In contrast, the partial fluorescence yield (PFY) spectra, which probe the bulk to a depth of more than 200 nm, exhibit subtle difference between the pristine and PGE materials (FIG. 5c). On the other hand, hard XAS of Ni K-edge, (FIG. 4b) which has a micron-scale probing ability, shows no difference between these two materials. Thus, combining the soft and hard XAS results, the addition of $KMnO_4$ enables a higher oxidization state of Ni ions enriching in the outer layer of the primary grains, but has no effect on the internal electronic states deep into the bulk.

Figure 7:
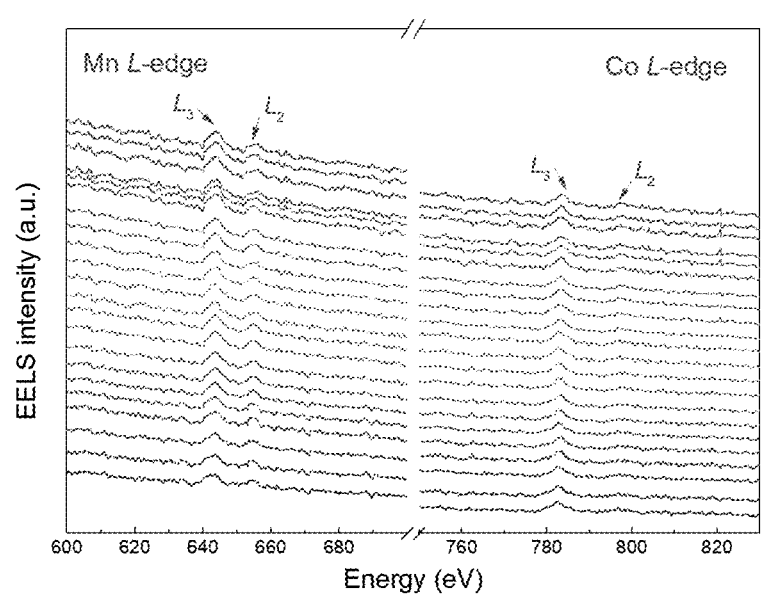
FIG. 7 shows the EELS spectra of Mn and Co L-edges scanning.

For a direct visualization of the $Ni^{3+}$ gradient, STEM-EELS was conducted for PGE-NCM811 and the line-scanning profiles were recorded along the indicated direction in the high-angle annular dark-field (HAADF) image (FIG. 4c). FIG. 4d shows the EELS spectra along the scanning pathway recorded every 12 Å, where two groups of peaks ($L_3$- and $L_2$-edge) emerged as the electrons from Ni $2p_{3/2}$ and $2p_{1/2}$ states, split by the spin-orbit interaction, transmit to the unoccupied 3d orbitals that are hybridized with 2p states of O. As expected, a double-peak character, which could be assigned to $Ni^{2+}$ and $Ni^{3+}$, respectively, is observed for the peaks of $L_3$-edge. Remarkably, the $Ni^{3+}$ intensities gradually increase along the scanning pathway from the inner to the outer layer, while the L-edges of Mn and Co also exhibited slight changes (FIG. 7). The EELS result provides certain evidence that the primary grains of the PGE material of the present invention are covered with $Ni^{3+}$-rich surfaces. These $Ni^{3+}$ ions were incorporated into the framework from the nanosheet precursor, which enabled a large proportion of interfacial atoms to be oxidized. The outermost depth of 20 nm surely makes a significant difference at the primary-grain scale, which may induce the local octahedral distortion and thereby enhance the performance of PGE-NCM811 material.

Local Octahedral Distortion of Monoclinic Phase in PGE-NCM811

Figure 15A:
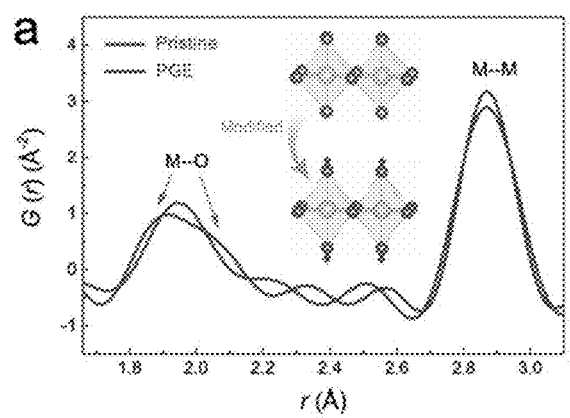
FIGS. 15a-c show the local structural distortion induced from the Ni-ion oxidation.

The R-3m structure of NCM811 possesses edge-sharing octahedron layers in the ab-plane, in which the lengths of all the six TM-O bonds are equal. Nevertheless, in the primary-grain surfaces of PGE-NCM811, the regular octahedra may be distorted due to the higher oxidation states of Ni ions. Accordingly, pair distribution function (PDF), which is recognized to be more sensitive to the local structure than XRD, was extracted from the total X-ray scattering for both pristine and PGE-NCM811 materials. FIG. 15a compares the low-r PDF patterns for these two materials. The first peak, which corresponds to the TM-O bond length, shows a clear splitting feature for PGE-NCM811, in contrast to the symmetrical peak shape for pristine NCM811. This provides direct evidence of the distorted octahedra in the PGE material, which demonstrates the successful material synthesis and design of primary-grain engineering.

Figure 15B:
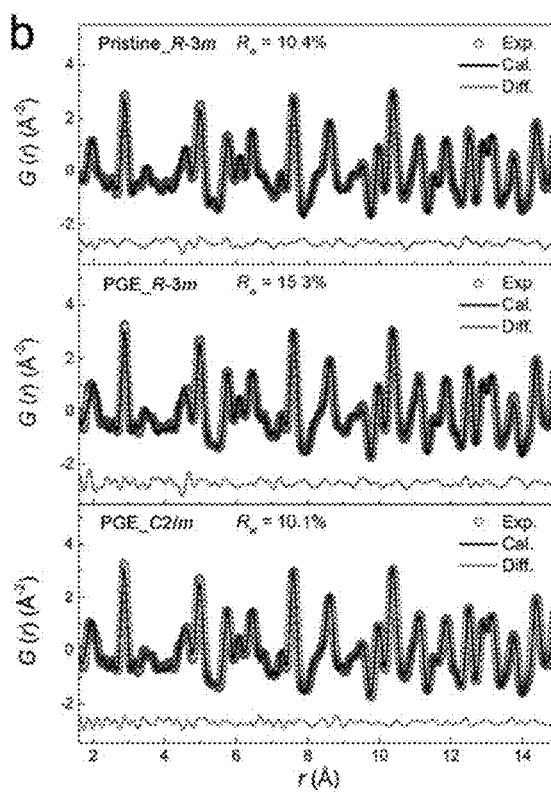

To distinguish the shorter and longer TM-O bonds in the distorted octahedron, full profile refinements of the PDF G(r) patterns were carried out (see Table 2). As seen in FIG. 15b, the hexagonal R-3m model fits well to the pristine NCM811 data with an agreement factor ($R_w$) of 10.4%, but fails to describe the PDF patterns of PGE-NCM811, especially for the first TM-O peak ($R_w$=15.3%). This failure is overcome by adopting the monoclinic model of C2/m ($R_w$=10.1%), in which the octahedra are allowed to distort without altering the layered framework.

TABLE 2

| R-3m | a-axis (Å) | | c-axis (Å) | | $O_z$ | $R_w$ (%) |
|---|---|---|---|---|---|---|
| Pristine-NCM811 | 2.870 (3) | | 14.19 (3) | | 0.240 (2) | 10.4 |

| C2/m | a-axis (Å) | b-axis (Å) | c-axis (Å) | Beta | $O_x$ | $O_z$ | $R_w$ (%) |
|---|---|---|---|---|---|---|---|
| PGE-NCM811 | 4.958 (9) | 2.872 (5) | 4.994 (8) | 108.9 (1) | 0.726 (11) | 0.228 (5) | 10.1 |

Figure 8:
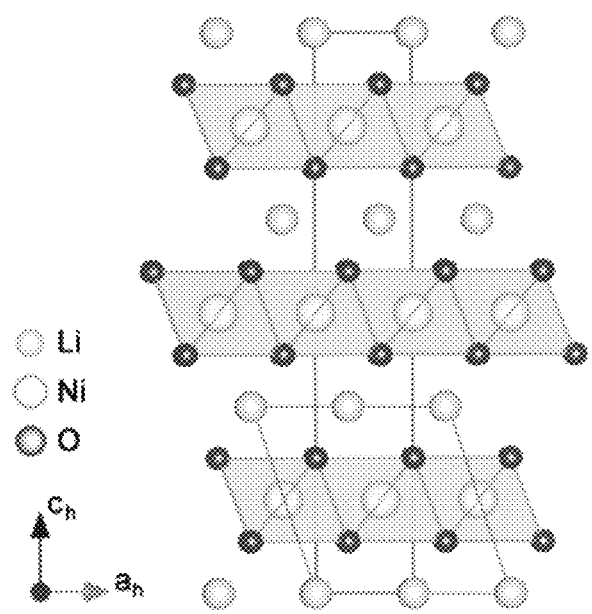
FIG. 8 shows the conversion relation between hexagonal R-3m and monoclinic C2/m unit cell.
Figure 15C:
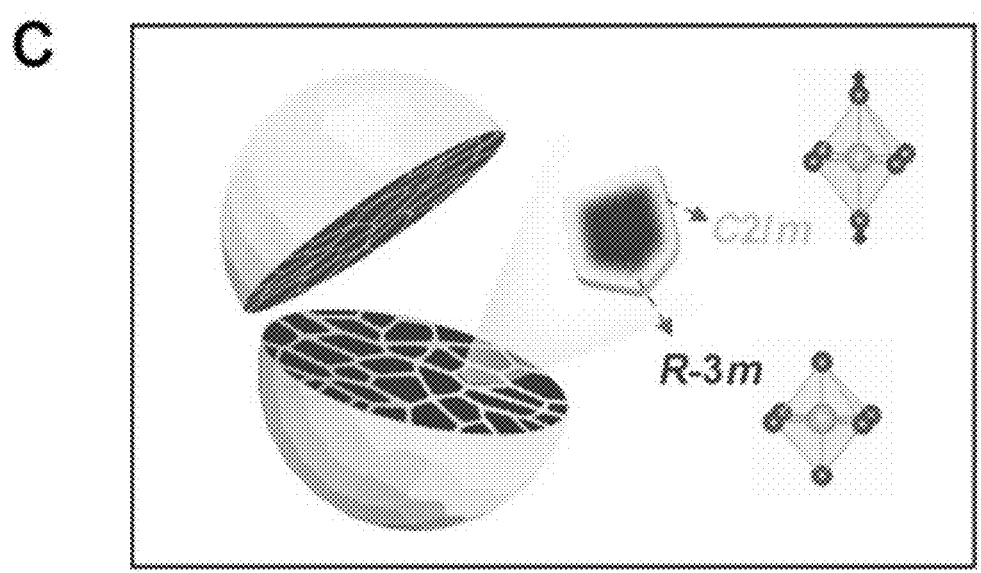

The conversion relationship between the R-3m and C/2m structures is provided in FIG. 8. From the refinement results, the pristine NCM811 material possesses equivalent TM-O bond-length of 1.959 Å. As for PGE-NCM811, four TM-O bonds, which lie in the rectangle section of the octahedron, contract to 1.947 Å. The other two TM-bonds along the symmetric axis of the octahedron expand to 2.036 Å. These PDF results suggest an elongated shape of the octahedrons from averaging the local structures of PGE-NCM811 (FIG. 15a inset). Such distortion may especially occur in the grain surface area within 20 nm depth, because the Ni atoms out of this range own the same oxidation state as the pristine material (see FIG. 1). Consequently, the primary grains of PGE-NCM811 are surrounded by the surfaces with elongated octahedra, forming a three-dimensional C2/m-type distorted network inside the secondary particles (FIG. 15c).

Enhanced Cycling Stability and Rate Capacity of PGE-NCM811

Figure 6A:
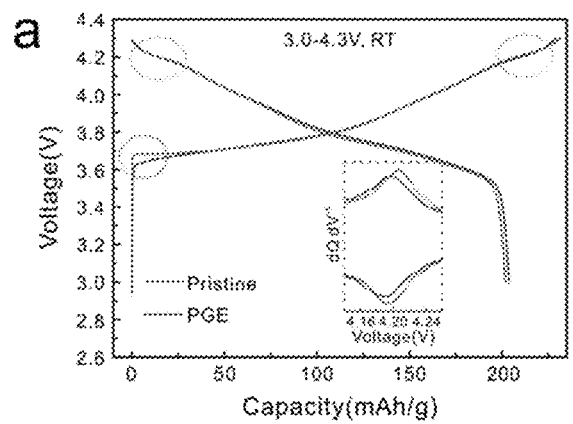
FIGS. 6a-6d depict the electrochemical performance of the pristine and PGE-NCM811 cathode materials.
Figure 6B:
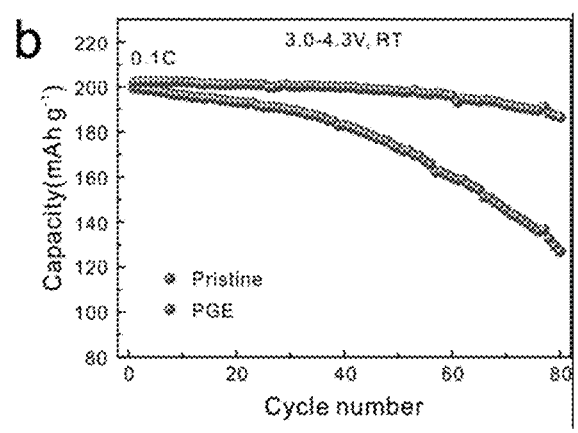
Figure 6C:
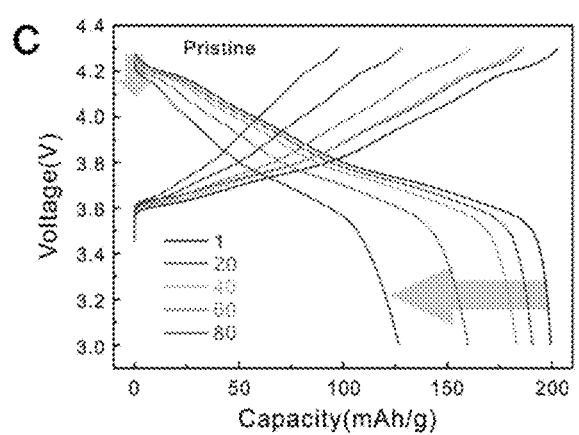
Figure 6D:
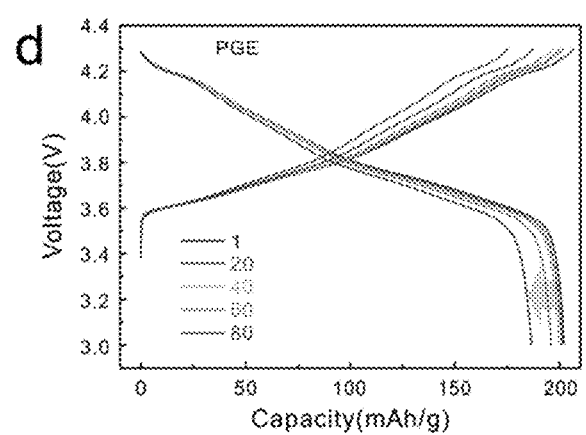

The pristine NCM811 and PGE-NCM811 materials were evaluated using the fabricated coin-type half cells, which were cycled between 3.0 V and 4.3 V (vs $Li^+$/Li) at room temperature FIG. 6a shows the initial cycle profiles at the current rate of 0.1 C (20 mA $g^{-1}$). Benefitting from the high content of Ni, both pristine and PGE-NCM811 materials deliver high discharge capacities of 201.8 mAh $g^{-1}$ and 203.8 mAh $g^{-1}$, respectively. However, the capacity retention of these two materials shows a clear contrast (FIG. 6b): the discharge capacity of pristine NCM811 quickly drops to 63.5% over 80 cycles, whereas that of the inventive PGE-NCM811 is well retained with minimum loss (98% for 50 cycles and 92.3% for 80 cycles). Along with the remarkable capacity retention, the PGE-NCM811 material also exhibits better voltage stability over cycling, as presented in the charge-discharge polarization profiles (FIGS. 3c-3d). The much smaller impedance of the cycled PGE-NCM811 cell, measured by AC impedance spectra, proves the capacity and voltage retentions (FIGS. 9a-9b). Apparently, the formation of the gradient monoclinic grain surfaces improves the cyclic stability of PGE-NCM811, which could be attributed to the structural evolution during the charge-discharge processes. From the initial polarization curves, the broad peak at 3.7 V, which corresponds to the H1-H2 phase transition, is inhibited for PGE-NCM811. Moreover, the more harmful H2-H3 phase transition that occurs at around 4.2 V, amplified by the differential capacity curves (dQ/dV, FIG. 6a inset), also becomes less obvious. These observations indicate that the PGE-NCM811 material experiences a moderate structural change upon charge-discharge cycles, which results in the enhanced cycling stability.

Figure 6E:
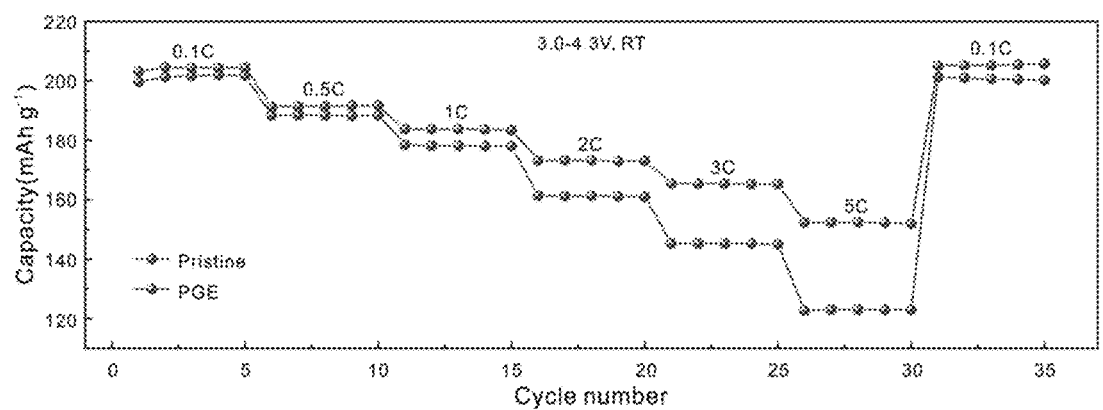
FIG. 6e shows the rate capability of the pristine and PGE-NCM811 materials.
Figure 10:
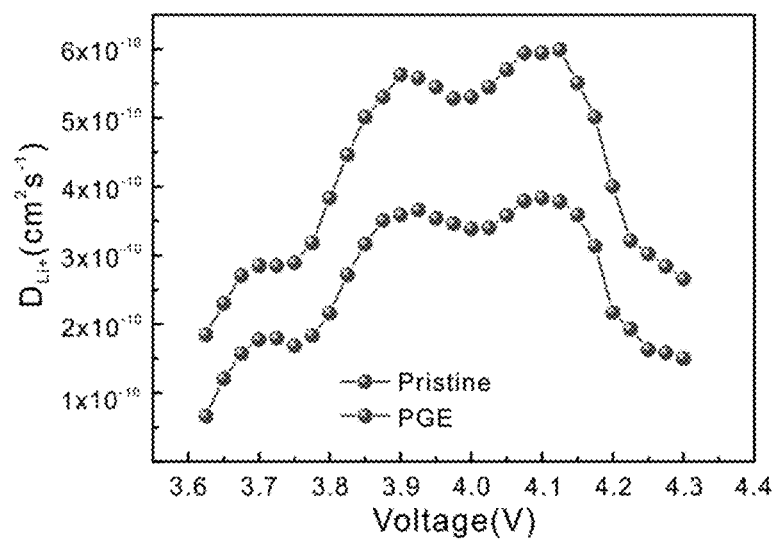
FIG. 10 shows the PITT results of both the pristine and PGE-NCM811 materials.

The rate capability of these two materials was also measured in the same voltage window of 3.0-4.3 V, with the current density ranging from 0.1 C to 5 C (FIG. 6e). Although the pristine NCM811 shows a comparable capacity to the inventive engineered NCM811 at 0.1 C, their capacity gap grows as the current density increases. In particular, the PGE-NCM811 material delivers a high capacity of 152.4 mAh g$^{-1}$ at 5 C, whereas the pristine one drops severely to 122.7 mAh g$^{-1}$. The improved rate capability of PGE-NCM811 cathode may be attributed to the facile Li$^+$ diffusion and electron transfer, as revealed by the potentiostatic intermittent titration (PITT, FIG. 10) and electroconductivity tests (Table 3), which may be derived from its higher conductivity of the monoclinic grain boundaries.

TABLE 3

| Target materials | Electronic conductivity κ (S cm$^{-1}$) |
|---|---|
| Pristine-NCM811 | 4.17 × 10$^{-3}$ |
| PGE-NCM811 | 6.15 × 10$^{-3}$ |

Moderate Structural Dynamics Upon Charge-Discharge Process of PGE-NCM811

Figure 11A:
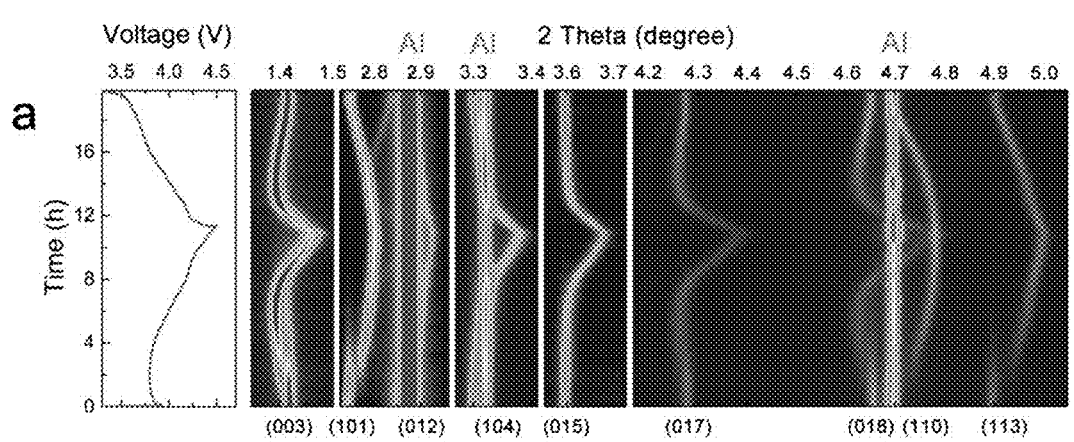
FIGS. 11a-11e depict in situ synchrotron XRD characterizations of the pristine and PGE-NCM811 materials at C/10 rate.
Figures 11B, 11C:
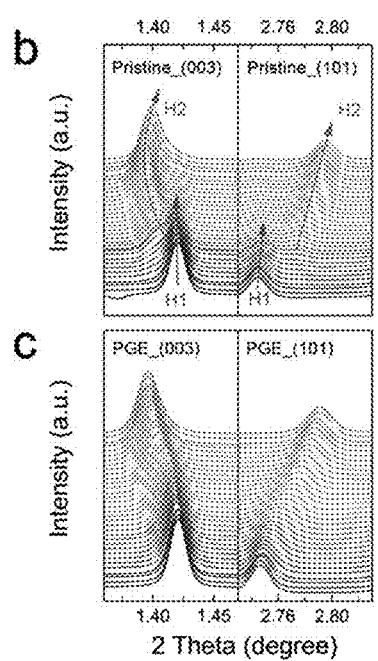
Figure 12:
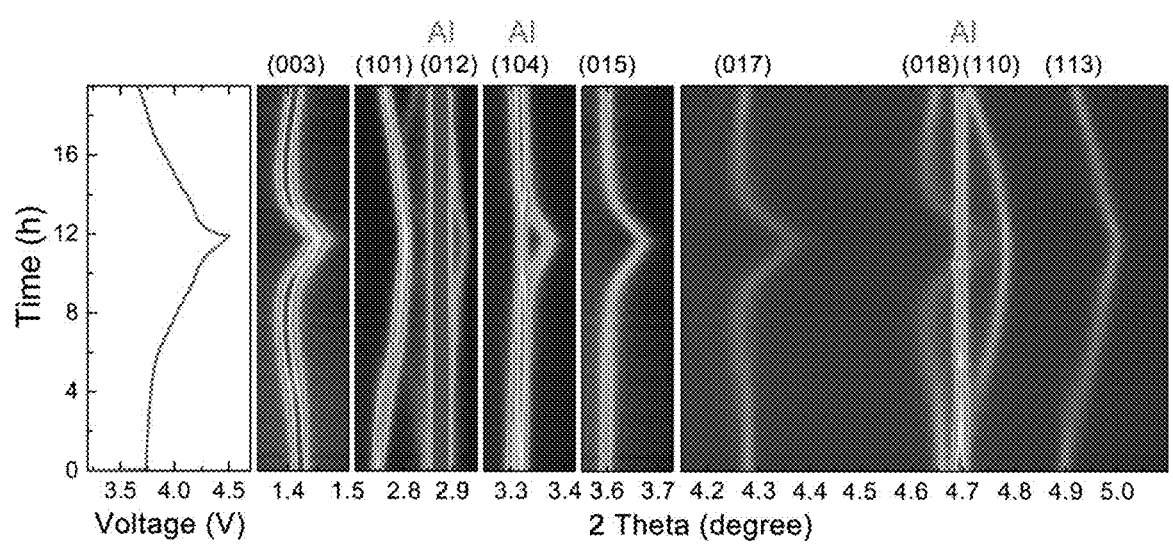
FIG. 12 shows contour plots of the PGE-NCM811 along with the related voltage profile.
Figure 13A:
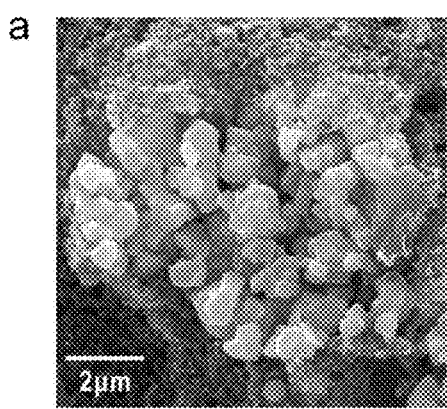
FIG. 13a-13d are SEM images of the electrodes after 100 cycles for the pristine (FIGS. 13a-13b) and PGE-NCM811 materials (FIGS. 13c-d). The whole electrodes disassembled from the cell are shown in the insets. The crack areas in the pristine NCM811 electrode are highlighted with circles in FIG. 13b.
Figure 13B:
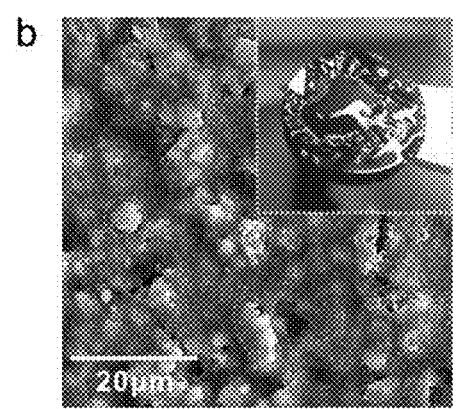
Figure 13C:
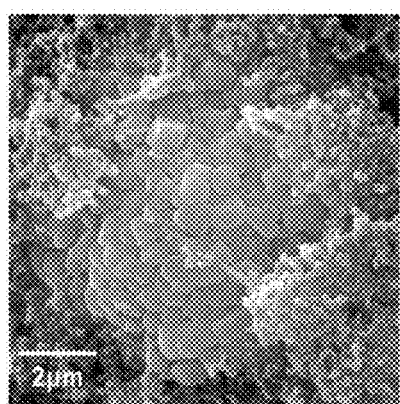
Figure 13D:
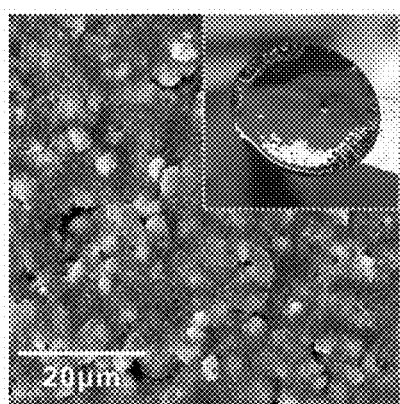

To elucidate the greatly enhanced performance of PGE-NCM811, in-situ synchrotron high-energy XRD measurement was performed on both pristine NCM811 and inventive PGE-NCM811 cells during the first charge-discharge process. From the contour plots of pristine NCM811 (FIG. 11a), a reversible feature is observed for all the diffraction peaks, except for an abrupt break at around 3.7 V upon charging. Two typical groups of peak profiles, (003) and (101), are presented to detail this behavior (FIG. 11b). Below 3.7 V, only one peak appears at the R-3m Bragg positions, which could be identified to the H1 phase. When the material is charged from 3.7 V to 3.8 V, new peaks emerge and become stronger, accompanied by a gradual fade of the H1 peaks. This result indicates the appearance of a new H2 phase and the structural transition from H1 to H2. Moreover, the line broadening of the XRD peaks also reveals a significant lattice strain in the H1-H2 coexisting region. Remarkably, for PGE-NCM811, no break is observed in the XRD contour plots (FIG. 12), and the (003) and (101) peaks also evolved smoothly without obvious line broadening (FIG. 11c). It may be speculated that the H1-H2 phase transition, which is a major concern for Ni-rich NCM materials, is completely inhibited in the inventive engineered material.

Figures 11D, 11E:
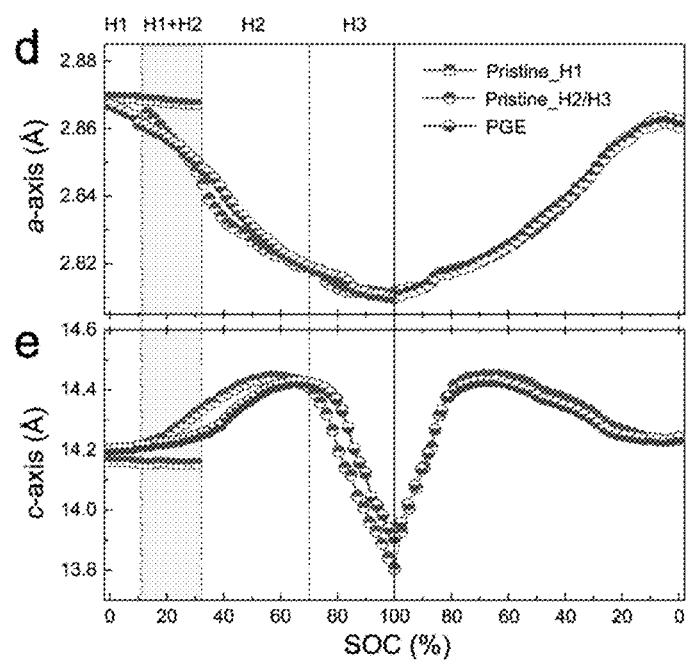

For a more specific view, the lattice evolutions of pristine and PGE-NCM811 materials are extracted from the in-situ XRD patterns using Rietveld method (FIGS. 11d-e). The typical R-3m model is adopted for both of the materials, since the locally distorted monoclinic phase, as well as its interfacial feature, results in very similar XRD patterns with the hexagonal structure. For the pristine material, only a slight contraction is observed for both a- and c-axis at the initial state of charge (SOC) stage, indicating that the R-3m framework of H1 could tolerate a small content of delithiation. As the SOC reaches to 10% (~3.7 V), the H1-H2 phase transition occurs, and the newly emerged H2 phase exhibits a structural break in contrast to the H1 structure. Such lattice mismatch between H1 and H2 becomes increasingly severe until the H1 is completely disappeared. Therefore, the coexistence of H1 and H2 in the lattice of the pristine NCM811 may induce mechanical fractures that deteriorate the reversible capacity and cyclic stability. As for PGE-NCM811, all in-situ XRD patterns can be described well with single model, confirming that the striking H1-H2 transition in the pristine material has been replaced by moderate solid-solution reaction in the inventive PGE material.

Upon further delithiation, the lattice of both materials undergoes a contraction of the a-axis and an expansion of the c-axis. Afterwards, another distinction emerges in the lattice evolution curves. For the pristine material, while the a-axis decreases steadily, the c-axis passes through a maximum value (14.45 Å) at around 4.2 V, and then drops steeply to 14.23 Å at the end of charge. This collapse of the interlayer distance could be identified as the H2-H3 phase transition, which is the key factor that induces fast performance degradation of layered cathode materials upon cycling. For the inventive PGE-NCM811, the occurrence of this transition is delayed to 4.3 V, which reduces the contraction of c-axis from 4.9% to 3.8% (22.4% reduction). For both of the materials, this H2-H3 phase transition is almost reversible, resulting in repeated lattice strains. Thus, the apparent weakening of the c-axis contraction, can significantly reduce the stress and thus the cracks at the macroscopic electrode level after long-term cycles (FIG. 13a-d). Further, the reduced contraction of c-axis also enlarges the lithium diffusion channels, which facilitates the rate capability of PGE-NCM811.

Functional Mechanisms of the Monoclinic Grain Boundaries of PGE-NCM811

Figure 14:
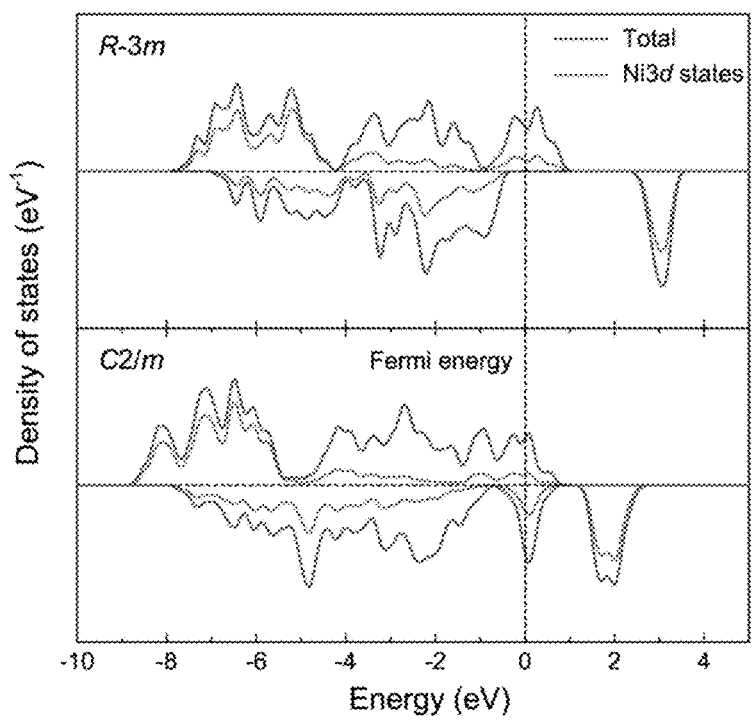
FIG. 14 shows the calculated partial density of states for the original R-3m (upper) and distorted C2/m (below) structures. The dashed line shows the position of the Fermi level.

In order to investigate the relationships between the local Jahn-Teller distortion and the electrochemical performance, the density functional theory (DFT) calculation was performed with on-site Coulombic interaction (DFT+U). The composition of LiNiO$_2$ was employed, and the structural parameters of the original R-3m and distorted C2/m cells utilized the results from the experimental PDF refinements (Table 2). The calculated partial density of states (PDOS, FIG. 14) shows a strong hybridization between the O-2p and Ni-3d states in the valance band (VB), and the octahedral crystal field splits the VB into two characters ($t_{2g}$ and $e_g$). For the typical R-3m cell, the half-filled $e_g$ band lying on the Fermi level implies conducting behavior. Interestingly, when the octahedra are elongated, both spin-up and spin-down electrons may contribute to the conduction through jumping into the holes. This means the distorted monoclinic grain surfaces in PGE-NCM811 provide a higher concentration of donors that facilitate the electronic transfer. In other word, the three-dimensional boundaries spreading over the secondary particles could act as a conducting network, which accounts for the high rate capability of the PGE-NCM811 material.

The enhanced cycling performance could be explained by the structural stability of the monoclinic grain surfaces during charge-discharge process, which constrains the internal grain lattice from cyclic structural changes. For the pristine material, the interlayer distance along c-axis is governed by the O—O repulsion. Upon deep delithiation, especially, this O—O repulsion could be weakened by the charge compensation between the highly hybridized Ni-3d and O-2p states, leading to the abrupt contraction of the interlayer distance during the H2-H3 transition. In the case of PGE-NCM811, the Jahn-Teller distortion of the octahedra lowers the energies of the Ni-3d and O-2p levels to deeper states (see FIG. 14). This means that the valance electrons are more localized to the Ni and O atoms, which makes it harder for the O-2p electrons to compensate the oxidation of Ni ions. In this regard, the repulsion between O—O can be maintained at a higher voltage, so that the H2-H3 phase transition is delayed. In addition, the H1-H2 phase transition in layered materials is induced by the rearrangement of the Li vacancies from order to disorder upon delithiation. The distorted octahedra, similar to the effect of dopants, could disturb the periodic potential walls by altering TM-TM interactions, which breaks the Li-vacancy ordering. Thus, the H1-H2 phase transition is replaced by a moderate solid-solution reaction.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A controlled oxidizing method for preparing a high-performance nickel-rich lithium ion battery cathode material having a composition of $LiNi_xM_{1-x}O_2$, where $0.6<x<0.9$, and M is one or more metals selected from the group consisting of Co, Mn, Fe, Ti, Zr, V, and Cr, the method comprising:

combining a water-soluble salt precursor of nickel and a water-soluble salt precursor of the one or more M metals with one or more oxidizing agents to form an aqueous solution;

alkalizing the aqueous solution to a selected pH value to produce precipitated precursors;

mixing the precipitated precursors with a lithium precursor to form a lithiated precursor;

calcining the lithiated precursor to form the nickel-rich lithium ion battery cathode material having a composition of $LiNi_xM_{1-x}O_2$, where $0.6<x<0.9$, and M is one or more metals selected from the group consisting of Co, Mn, Fe, Ti, Zr, V, and Cr, the nickel-rich lithium ion battery cathode material having a microstructure comprising primary particles with secondary particles formed on the surfaces of the primary particles, the primary particles having manipulated primary grain interfaces with nickel ions on surfaces of the primary particles being oxidized from a 2+ to a 3+ state, the secondary particles formed on the surfaces of the primary particles having a diameter of approximately 5-20 nm, the secondary particles including a three-dimensional monoclinic grain boundary network spread over a surface of the primary particles.

2. The method of claim 1, wherein the oxidizing agent is selected from the group consisting of potassium permanganate, potassium dichromate, hydrogen peroxide, perchloric acid and ferric chloride.

3. The method of claim 1, wherein the calcining comprising a first calcining process at a temperature of 400-600° C. and a second calcining process at a temperature of 600-1000° C.

4. The method of claim 1, wherein the water-soluble salt precursor of nickel is selected from one or more of nickel sulfate, nickel nitrate, or nickel chloride.

5. The method of claim 1, wherein alkalizing the aqueous solution includes adding one or both of sodium hydroxide and ammonium hydroxide.

6. The method of claim 1, wherein the lithium precursor is selected from one or more of lithium hydroxide, lithium oxalate, or lithium carbonate.

7. The method of claim 1, wherein the lithium precursor is mixed with the precipitated precursors at a ratio of Li/(Ni+M) of 1.06:1.

8. The method of claim 3, wherein the first calcining has a duration of 4-10 hours to form an intermediate product and the second calcining process has a duration of 10-20 hour to form a final product.

9. The method of claim 3, wherein secondary particles within a size from 5 μm to 10 μm are formed by the first and second calcining processes.

10. The method of claim 1, wherein low-spin Ni (III) ions create monoclinic surfaces on hexagonal cores of the secondary particles.

11. The method of claim 10, wherein a space group of the monoclinic surfaces is C2/m, while the space group of the hexagonal cores is R-3m.

12. A nickel-rich lithium ion battery cathode material formed by the method of claim 1 having a composition of $LiNi_xM_{1-x}O_2$, where $0.6<x<0.9$, and where M is one or more metals selected from the group consisting of Co, Mn, Fe, Ti, Zr, V, and Cr, the cathode material having a microstructure comprising primary particles with secondary particles formed on the surfaces of the primary particles, the primary particles having manipulated primary grain interfaces with nickel ions on surfaces of the primary particles being oxidized from a 2+ to a 3+ state, the secondary particles formed on the surfaces of the primary particles have a diameter of approximately 5-20 nm, the secondary particles including a three-dimensional monoclinic grain boundary network spread over a surface of the primary particles.

* * * * *